US009538430B2

(12) United States Patent
Khay-Ibbat et al.

(10) Patent No.: US 9,538,430 B2
(45) Date of Patent: Jan. 3, 2017

(54) SYSTEM AND METHOD FOR NETWORK SELECTION TO TRANSFER CALL SESSION

(71) Applicant: APPLE INC., Cupertino, CA (US)

(72) Inventors: Samy Khay-Ibbat, San Francisco, CA (US); Sarma V. Vangala, San Jose, CA (US); Swaminathan Balakrishnan, Sunnyvale, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 14/292,733

(22) Filed: May 30, 2014

(65) Prior Publication Data
US 2015/0350971 A1    Dec. 3, 2015

(51) Int. Cl.
*H04W 36/00* (2009.01)
*H04W 76/04* (2009.01)
*H04W 36/06* (2009.01)
*H04W 36/10* (2009.01)
*H04W 48/18* (2009.01)

(52) U.S. Cl.
CPC ..... *H04W 36/0066* (2013.01); *H04W 36/0022* (2013.01); *H04W 76/04* (2013.01); *H04W 36/06* (2013.01); *H04W 36/10* (2013.01); *H04W 48/18* (2013.01)

(58) Field of Classification Search
CPC ............. H04L 65/1006; H04L 65/1016; H04L 65/1069; H04L 67/14; H04L 63/10; H04L 67/1059; H04L 67/38; H04W 24/04; H04W 4/00; H04W 80/04; H04W 80/045; H04W 76/02; H04W 88/06; H04W 88/18; H04W 24/00; H04W 24/08; H04W 28/0236; H04W 76/00; H04W 76/022; H04W 76/025; H04W 80/00; H04W 36/00

USPC ..... 455/428, 414.1, 416, 439, 445; 370/328, 370/352, 389, 241, 242, 216, 329, 338, 370/218, 230, 260, 261, 262, 271
See application file for complete search history.

(56) References Cited

U.S. PATENT DOCUMENTS

| | | |
|---|---|---|
| 2006/0194584 A1 | 8/2006 | Henttonen et al. |
| 2008/0270618 A1* | 10/2008 | Rosenberg .......... H04L 65/1069 709/228 |
| 2010/0080116 A1* | 4/2010 | Agashe ................. H04W 36/08 370/216 |
| 2011/0029812 A1* | 2/2011 | Lu ....................... G06F 11/1474 714/18 |

(Continued)

FOREIGN PATENT DOCUMENTS

JP    A H10-013533    1/1998

*Primary Examiner* — Fred Casca
(74) *Attorney, Agent, or Firm* — Fay Kaplun & Marcin, LLP (57) ABSTRACT

A method performed by stations to transfer call sessions between different access networks. The methods include transmitting, by a first station to a second station, an invite to join a voice call on a first radio access network (RAN), receiving, by the second station, the invite, generating, by the second station, a response to the invite, determining, by the second station, that the response cannot be successfully transmitted to the first station, associating, by the second station, with a second RAN, generating, by the second station, a message indicating the second station has associated with the second RAN, transmitting, by the second station, the message to the first station, retransmitting, by the first station, the invite to join the voice call, receiving, by the second station, the invite on the second RAN and setting up the voice call between the first station and the second station.

16 Claims, 6 Drawing Sheets

(56) References Cited

U.S. PATENT DOCUMENTS

| | | | | |
|---|---|---|---|---|
| 2011/0317621 A1* | 12/2011 | Nagasawa | ............ | H04W 48/18 |
| | | | | 370/328 |
| 2012/0064884 A1 | 3/2012 | Ramachandran et al. | | |
| 2012/0258707 A1* | 10/2012 | Mathias | ................ | H04W 36/30 |
| | | | | 455/426.1 |
| 2014/0095922 A1* | 4/2014 | Baker | .................... | H04L 67/14 |
| | | | | 714/4.2 |
| 2014/0376511 A1* | 12/2014 | Kalapatapu | ......... | H04L 65/1016 |
| | | | | 370/331 |

* cited by examiner

SYSTEM AND METHOD FOR NETWORK SELECTION TO TRANSFER CALL SESSION

BACKGROUND INFORMATION

A first station may be configured to communicate wirelessly with a second station. Specifically, the first station may transmit data to and receive data from the second station through a wireless communications network. The first and second stations may use the network to communicate using a variety of different applications. For example, the first station may be a mobile origination (MO) station while the second station may be a mobile terminating (MT) station for a voice call. The voice call may be performed in a variety of different manners. For example, when the MO or MT station is connected to a 2G or 3G network, the voice call may be performed using a circuit switched voice call. In another example, when the MO or MT station is connected to a Long Term Evolution (LTE) network, the voice call may be performed using a Voice over LTE (VoLTE) call.

When the VoLTE call is performed, the MO and MT stations may perform an initial setup procedure. In the initial setup procedure, the MO station may transmit an invitation to the MT station to participate in the VoLTE call. As a VoLTE call, the invitation is transmitted over the LTE network. The MT station may receive the invitation and provide a response, also over the LTE network. However, there may be a variety of reasons that prevent the MT station from responding to the invitation. For example, the MT station may be aware that there is an incoming call from the MO station but cannot provide the response to the invitation over the LTE network. In such a scenario, the call may fail to establish which is a very poor end user experience, particularly since the user of the MT station may have received the indication and manually responded to the invitation (e.g., a prompt). Furthermore, additional attempts for the VoLTE call may continue to fail until the MT station is capable of transmitting the response over the LTE network.

DETAILED DESCRIPTION

The exemplary embodiments describe a method that is performed by two stations. The method includes transmitting, by a first station to a second station, an invite to join a voice call on a first radio access network (RAN), receiving, by the second station, the invite, generating, by the second station, a response to the invite, determining, by the second station, that the response cannot be successfully transmitted to the first station, associating, by the second station, with a second RAN, generating, by the second station, a message indicating the second station has associated with the second RAN, transmitting, by the second station, the message to the first station, retransmitting, by the first station, the invite to join the voice call, receiving, by the second station, the invite on the second RAN and setting up the voice call between the first station and the second station.

The exemplary embodiments further describe a method performed by a first station, the method including receiving an invite for a setup procedure of a voice call from a second station, the first station being connected to a Long Term Evolution radio access network(LTE-RAN), the first station configured to perform the voice call using Voice over LTE (VoLTE), determining the first station is incapable of transmitting a response to the invite to the second station using the LTE-RAN, connecting the first station to a legacy RAN, wherein the legacy RAN performs voice calls as circuit switched calls, generating a switch message upon connecting to the legacy RAN, the switch message including an indication the first station has associated with the legacy RAN, transmitting the switch message to the second station, receiving the invite for a setup procedure of a voice call from the second station, wherein the setup procedure is performed consistent with the legacy RAN, and performing the voice call with the second station via the legacy RAN.

The exemplary embodiments also describe a method performed by a first station, the method including transmitting an invite for a setup procedure of a voice call to a second station, the first station being connected to a Long Term Evolution radio access network(LTE-RAN), the first station configured to perform the voice call using Voice over LTE (VoLTE), receiving a switch message from the second station, the switch message including an indication the second station has associated with a legacy RAN, wherein the legacy RAN performs voice calls as circuit switched calls, re-transmitting the invite to the second station, performing the setup procedure for the voice call and performing the voice call with the second station.

The exemplary embodiments may be further understood with reference to the following description and the related appended drawings, wherein like elements are provided with the same reference numerals. The exemplary embodiments are related to a system and method for network selection to transfer a call session. Specifically, the transfer relates to a setup procedure for a voice call for establishing the voice call. More specifically, a mobile originating (MO) station may invite a mobile terminating (MT) station to the voice call in which both MO and MT stations are connected to a Long Term Evolution radio access network (LTE-RAN). The MO and MT stations may perform the voice call using a Voice over LTE (VoLTE) call session. As such, data packets are transmitted between the MO and MT stations over the LTE-RAN during a setup procedure to establish the voice call. If the MT station is incapable of transmitting a response to an invitation for the voice call over the LTE-RAN, the MT station may provide a message to the MO station indicating that a different network is being selected that may be more reliable such as a legacy radio access network (RAN) (e.g., 2G network, 3G network, etc.).

Figure 1:
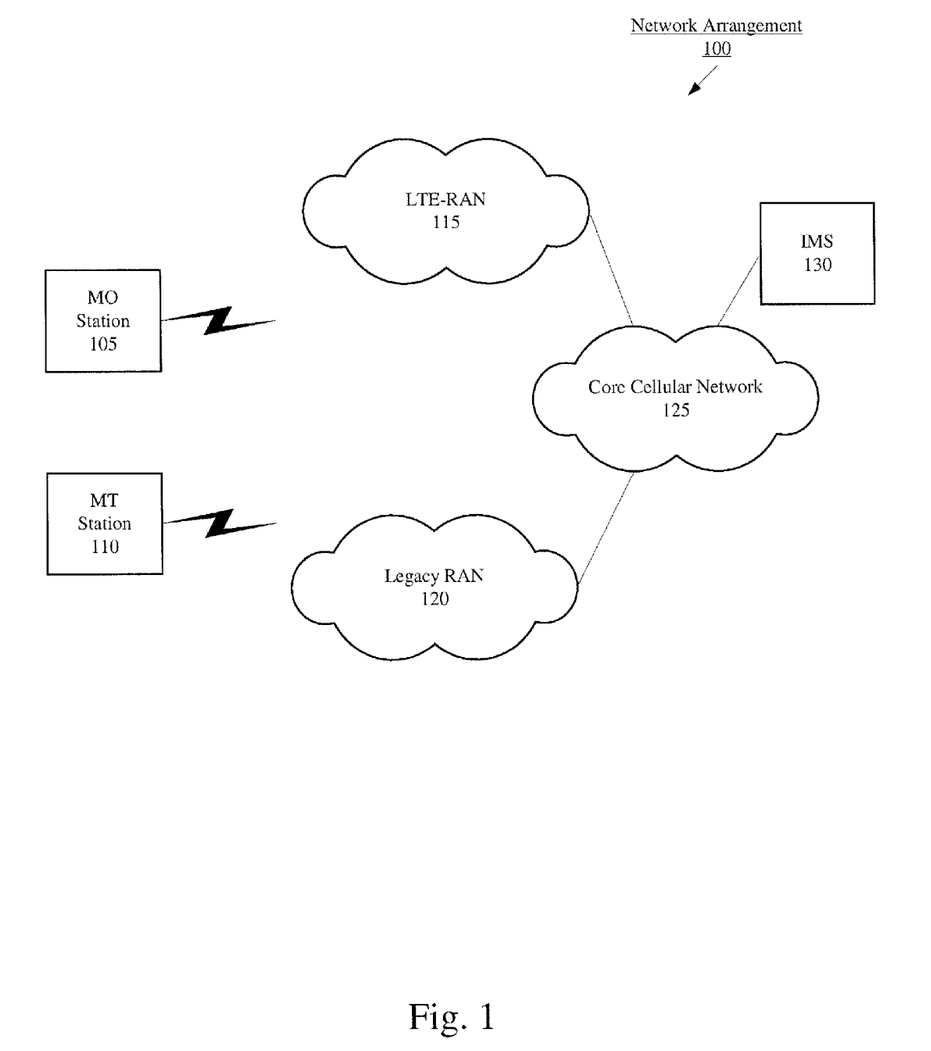
FIG. 1 shows an exemplary network arrangement for stations to perform a voice call.

FIG. 1 shows an exemplary network arrangement 100 for a MO station 105 to perform a voice call with a MT station 110. Specifically, the MO station 105 may wirelessly communicate with the MT station 110 to perform the voice call. The network arrangement 100 may include an LTE-RAN 115, a legacy RAN 120 and a cellular core network 125.

According to the exemplary embodiments, the MO station 105 and the MT station 110 may utilize both the LTE-RAN 115 and the legacy RAN 120. As discussed above, when related to voice calls, the LTE-RAN 115 may be a substantially all-IP based network standard while the legacy RAN 120 may utilize a circuit switched protocol through a dedicated communications channel. While the exemplary embodiments are described with reference to an LTE-RAN and a legacy RAN (such as a 2G or 3G network), it is not required that the networks be these precise type of networks. For example, the first network could be any type of packet switched or IP based network and the legacy RAN may be any type of circuit switched network. For example, either network 115, 120, may be a WiFi network such as defined under IEEE 802.11 a/b/g/n/ac. The WiFi network 105 may further represent any type of WiFi network such as a personal WiFi network, a home WiFi network, an enterprise WiFi network, a HotSpot, etc. In some cases, WiFi networks may be referred to as Wireless local area networks (WLANs). The networks 115, 120 may also include any network that is referred to as a WLAN. Thus, when it is described in the exemplary embodiments that the MO station 105 and the MT station 115 are connected to the LTE-RAN 115 or legacy RAN 120, the MO station 105 and MT station 110 may, instead, be connected to a WiFi network.

The MO station 105 and the MT station 110 may represent any electronic device that performs the voice call. It may be considered that the MO station 105 and the MT station 110 have the required hardware and software configuration to perform VoLTE calls when connected to the LTE-RAN 115. A voice call may be established between the MO station 105 and the MT station 110 using a variety of different applications. When the MO or MT station is connected to the legacy RAN 120, the stations 105, 110 may participate in the voice call using a circuit switched voice call. With regard to voice transmissions, the legacy RAN 120 typically utilizes a dedicated communications channel to carry the voice calls, although this is not a requirement.

A VoLTE call relates to delivering the voice service as data flows over the LTE-RAN 115. The VoLTE call may be performed as a substantially all-Internet Protocol (IP) based network standard without requiring the dedicated communications channel used in the legacy networks (e.g., legacy RAN 120). Therefore, the information used in the initial setup procedure and all voice information used during the VoLTE call are transmitted as data packets over the LTE-RAN 115.

The VoLTE call may use an IP Multimedia Subsystem (IMS) 130 that is associated with the cellular core network 125 of the provider of the LTE-RAN 115. The IMS 130 allows for multimedia access using a common IP interface. Using the IMS 130, connections may be made over different protocols. Specifically, with the IMS 130, a VoLTE call is able to inter-operate with circuit switched voice networks. For example, if the MO station 105 were connected to the LTE-RAN 115 and initiated a call to the MT station 110 that was connected to the legacy RAN 120, the IMS 130 is used to interconnect the calls between the different networks. The IP interface of IMS 130 may also allow a VoLTE call to inter-operate with other voice networking technologies even when circuit switched networks are not available. Thus, the MO station 105 may be connected to the LTE-RAN 115, but the MT station 110 is not required to be connected to the LTE-RAN 115 or vice versa for a voice call to be performed. Thus, when both the MO station 105 and the MT station 110 are connected to the LTE-RAN 115, the VoLTE call may be performed by both stations 105, 110. When only the MO station 105 is connected to the LTE-RAN 115 (or capable of using both the uplink and downlink transmissions thereof), the MO station 105 may perform the VoLTE call. However, the MT station 110 may not be connected to the LTE-RAN 115 such that the MT station 110 performs the circuit switched voice call. In this manner, the voice call between the MO station 105 and the MT station 110 is still established via the IMS 130.

When establishing the voice call between the MO station 105 and MT station 110, the legacy RAN 120 may be considered to be more reliable than the LTE-RAN 115 when considering the coverage area that the legacy RAN 120 provides. For example, a station may not have sufficient uplink transmission power to transmit a response to an invitation to a VoLTE call but may have sufficient uplink transmission power to respond to a call from the legacy RAN 120. However, those skilled in the art will also understand that the LTE-RAN 115 may be preferred over the legacy RAN 120 when considering the potential data transfer rates.

If both the MO station 105 and MT station 110 are connected to the LTE-RAN 115 and registered for voice over IMS 130 when connected to the LTE-RAN 115, both the MO station 105 and MT station 115 may have simultaneous data and voice over the LTE-RAN 115, thereby providing the stations 105 and 110 with the option to perform a VoLTE call. When both the MO station 105 and MT station 110 are capable of utilizing the LTE-RAN 115, the VoLTE call may be preferable over the circuit switched voice call for a variety of reasons from the user perspective and the network perspective. In fact, when the station is connected to the LTE-RAN 115, the station may be configured to always use the VoLTE call to participate in the voice call. However, there may be a variety of scenarios in which the LTE-RAN 115 may not be utilized by one of the stations. For example, the MT station 110 may be incapable of using the uplink transmission in the LTE-RAN 115 during a setup procedure for the VoLTE call, resulting in the voice call failing to establish. In another example, if the station is not registered on the IMS 130, the station may rely on the LTE-RAN 115 for data transfer and the legacy RAN 120 for voice calls.

The exemplary embodiments provide a seamless manner of transferring the call session to the legacy RAN 120 network in order to establish the voice call between the MO station 105 and MT station 110. Specifically, when the MT station 110 is incapable of responding to an invitation for a VoLTE call, the MT station 110 may provide a switch message to the MO station 105 that indicates that the MT station 110 cannot utilize the LTE-RAN 115. The switch message may also indicate to the MO station 105 that the MT station 110 intends to utilize the legacy RAN 120 for the voice call. The MO station 105 may perform different operations upon receiving the switch message from the MT station 110 for the voice call to be established.

Figure 2:
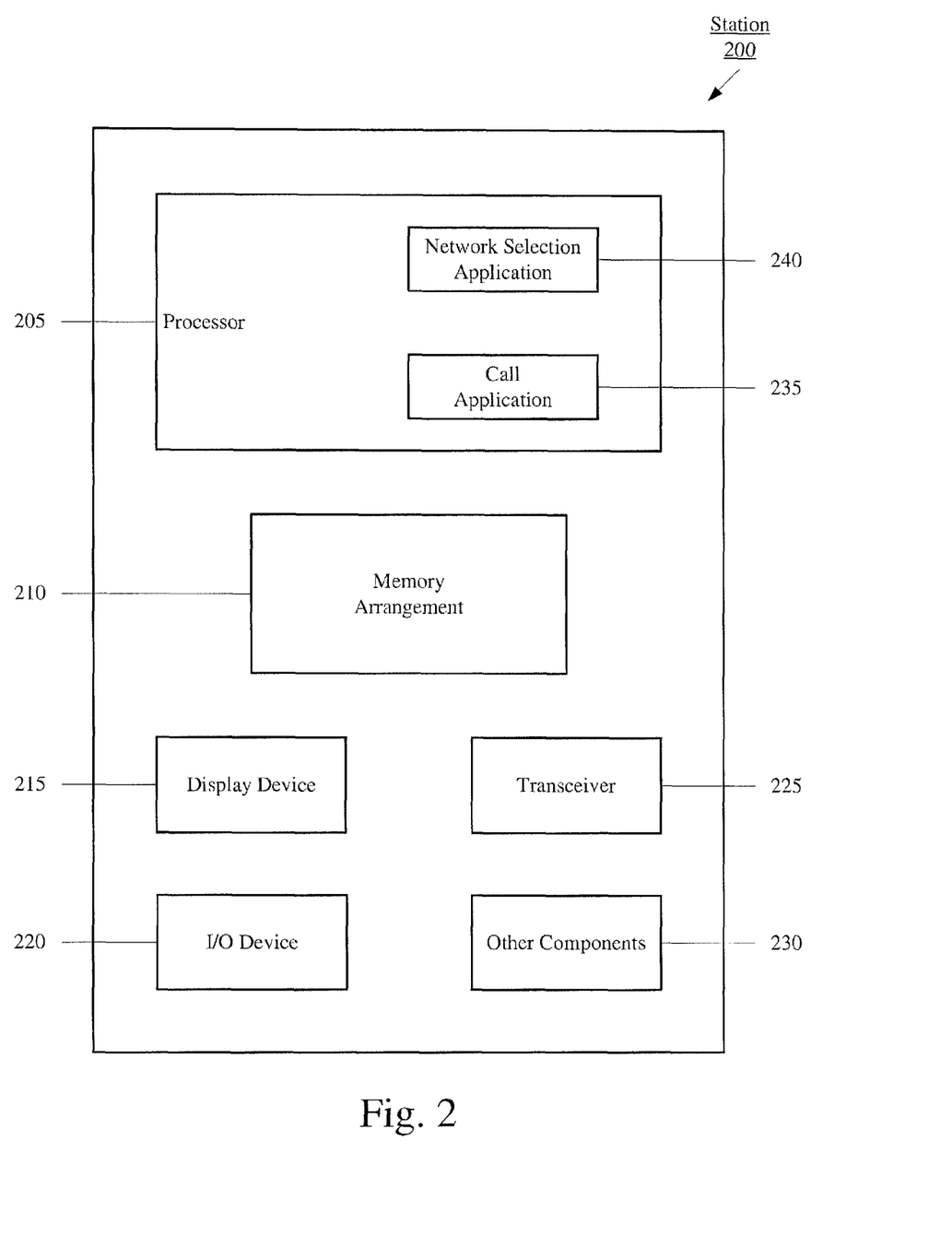
FIG. 2 shows an exemplary station configured to perform the voice call.

FIG. 2 shows an exemplary station 200 configured to perform the voice call using the VoLTE call or the circuit switched voice call. Specifically, the station 200 may represent an electronic device such as the MO station 105 and the MT station 110. The station 200 may be any electronic component configured to join a network such as a portable device (e.g., a cellular phone, a smartphone, a tablet, a phablet, a laptop, etc.) or a stationary device (e.g., a desktop computer). The station 200 may include a processor 205, a memory arrangement 210, a display device 215, an input/ output (I/O) device 220, a transceiver 225, and other components 230 such as a portable power supply, an audio I/O device, etc.

The processor 205 may be configured to execute a plurality of applications of the station 200. The processor 205 may be an applications processor, a baseband processor or a combination thereof. The applications may include a web browser when connected to the LTE-RAN 115 or the legacy RAN 120 via the transceiver 225. The web browser may represent a data-related application.

In another example, the applications may include a call application 235. The call application 235 may represent a voice-related application that performs the voice call for the station 200. When the station 200 is the MO station 105, the call application 235 may generate the invitation for the voice call. When the station 200 is the MT station 110, the call application 235 may receive the invitation for the voice call. The call application 235 may then generate a response to the invitation. This setup procedure for the voice call may be used to establish the voice call between the MO station 105 and the MT station 110. When the voice call has been established, the call application 235 may perform the functionalities associated with transmitting and receiving voice information during the voice call. For example, the audio I/O device may receive raw voice from the user and convert the raw voice to data packets which may be transmitted via the transceiver 235 to the network. In a specific example, the voice data packets may be transmitted over the LTE-RAN 115 when the voice call is the VoLTE call.

The call application 235 may also determine the type of voice call that is to be performed by the station 200. For example, when the station 200 is connected to the LTE-RAN 115, the voice call may be the VoLTE call. In another example, when the station 200 is only connected to the legacy RAN 120, the voice call may be the circuit switched voice call. It should be noted that the call application 235 may be configured to always perform the VoLTE call when connected to the LTE-RAN 115. However, as will be described in further detail below, the exemplary embodiments provide a manner of using the legacy RAN 120 even when the station 200 is connected to the LTE-RAN 115.

In a further example and according to the exemplary embodiments, the applications may include a network selection application 240. As will be described in further detail below, the network selection application 240 may perform the transfer of the call session when the station 200 is experiencing conditions that prevent the voice call from being established. Specifically, when the station 200 (as the MT station 110) is incapable of responding to an invitation to the voice call using a VoLTE call, the network selection application 240 may use the legacy RAN 120 to establish the voice call. The network selection application 240 may also generate a switch message to be transmitted to the MO station 105 indicating that the MT station 110 is using the legacy RAN 120.

It should be noted that the call application 235 and the network selection application 240 being an application (e.g., a program) executed by the processor 205 is only exemplary. The applications 235-240 may also be represented as a separate incorporated component of the station 200 or may be a modular component coupled to the station 200.

The memory arrangement 210 may be a hardware component configured to store data related to operations performed by the station 200. For example, the memory arrangement 210 may store a caller database associated with the call application 235. The caller database may be, for example, a directory of people having associated contact information to be used by the call application 235 in a voice call with a corresponding station of a selected person. The memory arrangement 210 may also store further data such as measured network parameters for the LTE-RAN 115. The display device 215 may be a hardware component configured to show data to a user while I/O device 220 may be a hardware component configured to receive inputs from the user and output corresponding data. The other components 230 may include a portable power supply (e.g., battery), a data acquisition device, ports to electrically connect the station 200 to other electronic devices, etc.

Figure 3:
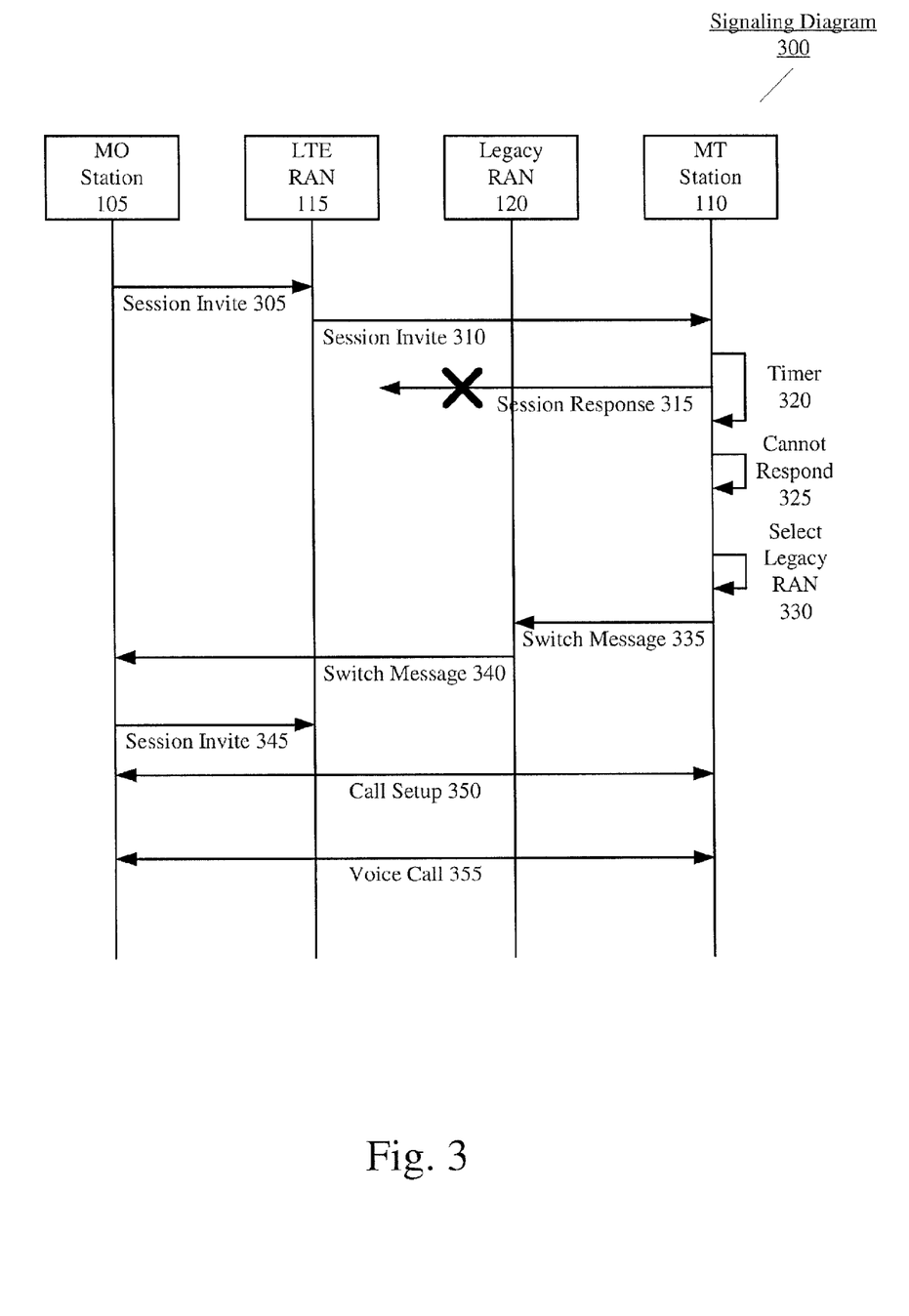
FIG. 3 shows a first exemplary signaling diagram to perform a network selection to transfer a call session from a first network to a second network.

FIG. 3 shows a first exemplary signaling diagram 300 to perform a network selection to transfer a call session from the LTE-RAN 115 to the legacy RAN 120. Specifically, the signaling diagram 300 relates to a scenario where the MO station 105 remains on the LTE-RAN 115 after receiving a switch message form the MT station 110 indicating the MT station 110 is switching to the legacy RAN 120.

As illustrated, the MO station 105 may transmit a session invite 305 to the MT station 110. Specifically when the voice call is performed by the MO station 105 as a VoLTE call (e.g., the MO station 105 is connected to the LTE-RAN 115), the session invite 305 may be transmitted to a component of the LTE-RAN 115 (e.g., an enhanced Node B (eNB)). When the call is a VoLTE call, the session invite 310 may be a session initiation protocol (SIP) invite. Since both the MO station 105 and the MT station 110 are connected to the LTE-RAN 115, the LTE-RAN 115 will then forward the session invite 310 to the MT station 110. Those skilled in the art will understand that there may be additional signaling within the LTE-RAN 115 to ensure that the session invite 310 is transmitted to the MT station 110. However, the signaling diagram 300 is only meant to be a simplified overview of the signaling process and does not show each and every signal that is transmitted to complete the voice call.

The MT station 110 may be connected to and capable of decoding the downlink of the LTE-RAN 115 such that the session invite 310 is received. The MT station 110, when in receipt of the session invite 310, may determine various parameters included in the session invite 310 such as the identity of the MO station 105. In a specific example, upon receiving the SIP invite, the MT station 110 may have been paged for IMS 130 as well as establish a Radio Resource Control (RRC) connection. The MT station 110 may generate a session response 315 to the session invite 310 to establish the voice call. In this example, it is considered that the session response 315 does not reach the LTE-RAN 115. However, for the purpose of providing a complete discussion, if the session response 315 was received by the LTE-RAN 115 and forwarded to the MO station 105, a VoLTE call may be setup between the MO station 105 and MT station 110.

In addition to generating the session response 315, the network selection application 240 of the MT station 110, upon receiving the session invite 310, may initiate a timer 320. In a first example, the timer 320 may be related to consecutive "out of sync" indications. The "out of sync" indications will be describe in greater detail below. In a second example, a preset timer may be selected to avoid reselecting systems too aggressively. Thus, this preset timer may be used as a threshold to determine when a network selection is to be performed by the network selection application 240. The preset timer may be, for example, from 1 second to 3 seconds.

During the period of the timer 320, the call application 235 of the MT station 110 may attempt to respond to the session invite 310 by transmitting the session response 315, which may be in the form of a SIP response. However, as shown in FIG. 3, the MT station 110 may be incapable of transmitting the session response 315 to the MO station 105 using the LTE-RAN 115. There may be any number of conditions that prevent the MT station 110 from providing the session response 315 to the LTE-RAN 115, some examples being provided below.

In a first example, the MT station 110 may be in an uplink limited condition in the LTE-RAN 115 while still capable of decoding the downlink in the LTE-RAN 115. The MT station 110 may therefore receive the session invite 310 transmitted through the LTE-RAN 115 from the MO station 105, but is unable to respond. The uplink limited condition may result in the MT station 110 transmitting the session response 315, but the session response 315 never reaching the destination, namely the LTE-RAN 115 or MO station 105.

In a second example, the MT station 110 may determine a radio link failure (RLF) event. The RLF event may be a break in the physical (PHY) layer. The RLF event may be caused by a variety of different scenarios as would be understood by one skilled in the art. For example, there may be a consecutive number of "out of sync" indications (e.g., N310) from the PHY layer. After a predetermined time of this occurring (e.g., T311), the RLF event may be determined. In another example, the RLF event may be assumed to have occurred by the station 200 when the measured Reference Signal Received Power (RSRP) or the measured Reference Signal Received Quality (RSRQ) is below a predetermined threshold, when a Physical Downlink Control Channel (PDCCH) failed to decode due to power signal quality (e.g., low RSRP or RSRQ), when a Physical Downlink Shared Channel (PDSCH) failed to decode due to power signal quality, etc. In yet another example, the RLF event may be assumed to have occurred by an Evolved NodeB (eNB) of the LTE-RAN 115 when the Signal-to-Interference-plus-Noise Ratio (SINR) from the station 200 is significantly lower than the configuration of the eNB, when the eNB is incapable of detecting an Acknowledgement (ACK) or a negative ACK (NACK) from the station 200 for a PDSCH, etc.

Once the timer 320 has lapsed, the network selection application 240 determines that the MT station 110 is incapable of responding 325. For example, when the above noted conditions are present on the MT station 110 (e.g., uplink limited scenario, RLF event, etc.), the network selection application 240 may determine that the MT station 110 may not be capable of performing the voice call as a VoLTE call via the LTE-RAN 115.

Once this determination is made, the network selection application 240 of the MT station 110 may select 330 the legacy RAN 120 over the LTE network 115, e.g., the network selection application 240 may determine that a circuit switched voice call should be performed over the legacy RAN 120. The network selection application 240 may indicate to the call application 235 that the voice call is to be performed over the legacy RAN 120. If the call application 235 is configured to always use the LTE-RAN 115 when available, this indication may override this configuration. The network selection application 240 may also constructively indicate that the LTE-RAN 115 is unavailable such that the legacy RAN 120 is to be selected for use in the voice call by the call application 235. In this manner, the configuration to use the VoLTE call when the LTE-RAN 115 is available is not be violated. The MT station 110 may perform an association functionality to connect to a base station of the legacy RAN 120. This association functionality is not shown in the signaling diagram and should be understood the be the association procedure that is used for the network type of the legacy RAN 120 (e.g., 3G, 2G, etc.).

Since the legacy RAN 120 may be more reliable in the uplink transmission (e.g., when the SIP response failed due to the uplink limited scenario in the LTE-RAN 115), the network selection application 240 may utilize the legacy RAN 120 for any uplink transmissions. By moving to the legacy RAN 120, the MT station 110 may perform several operations based upon the communications standard being used. For example, in 3GPP2, the MT station 110 may register for short messaging service (SMS) over IMS only on Enhanced High Rate Packet Data (eHRPD) (e.g., Enhanced Voice-Data Optimized (1x EV-DO)) and voice over 1x. In another example, in 3GPP, the MT station 110 may register for SMS over IMS and voice over Wideband Code Division Multiple Access (WCDMA). In this manner, the MT station 110 may move to the legacy RAN 120 from the LTE-RAN 115. As will be described in greater detail below, the MT station registers for SMS because this functionality is used to transmit information to the MO station to continue with the voice call.

After the association with the legacy RAN 120, the network selection application 240 may generate a switch message 335 to be transmitted to the MO station 105. As described above, this message may be transmitted via SMS. However, if the MO station 105 and MT station 110 have another manner of transmitting messages between the stations (e.g., a proprietary messaging system), this other type of messaging system may also be used. In other words, the functionality that is of concern is that the MT station 110 transmits a message that reaches the MO station 105. In this example, the switch message 335 may be transmitted via SMS from the MT station 120 via the legacy RAN 120 which forwards the switch message 340 to the MO station 105.

The network selection application 240 of the MO station 105 may receive the switch message 340 from the MT station 110. It should be noted that when the switch message 340 is in the form of an SMS message, it may be formatted such that the user of the MO station 105 is not aware that the message has been received. That is, the network selection application 240 may receive the switch message 340 and perform the described functionality without any input from the user of the MO station 105. The receiving of the switch message 340 may indicate to the MO station 105 that the call has not failed to establish, e.g., the MT station 110 has received the session invite 310, but cannot respond to the session invite 310 because of limited RF scenario and the MT station 110 has moved to the legacy RAN 120. It should be noted that from a network perspective, the switch message 340 may be used so that there is no re-page from the MO station 105 to the MT station 110 over the legacy RAN 120.

The MO station 105 may remain connected to the LTE-RAN 115 and participate in the voice call using the VoLTE call while the MT station 110 participates in the voice call using the legacy RAN 120. Upon receipt of the switch message 340, the MO station 105 may be configured to re-initiate the voice call transparently to the MT station 110. Specifically, the MO station 105 may again transmit a session invite 345 to the LTE-RAN 115 indicating that a call should be placed to the MT station 110. However, since the MT station 110 is no longer connected to the LTE-RAN 115, a call setup procedure 350 involving the LTE-RAN 115, legacy RAN 120, cellular core network 125 and IMS 130 is performed to connect the MO station 105 with the MT station 110. It should again be noted that the IMS 130 provides the functionality for VoLTE call to inter-operate with the circuit switched voice call. Once this setup procedure 350 has been completed, the voice call 355 may be performed.

Figure 4:
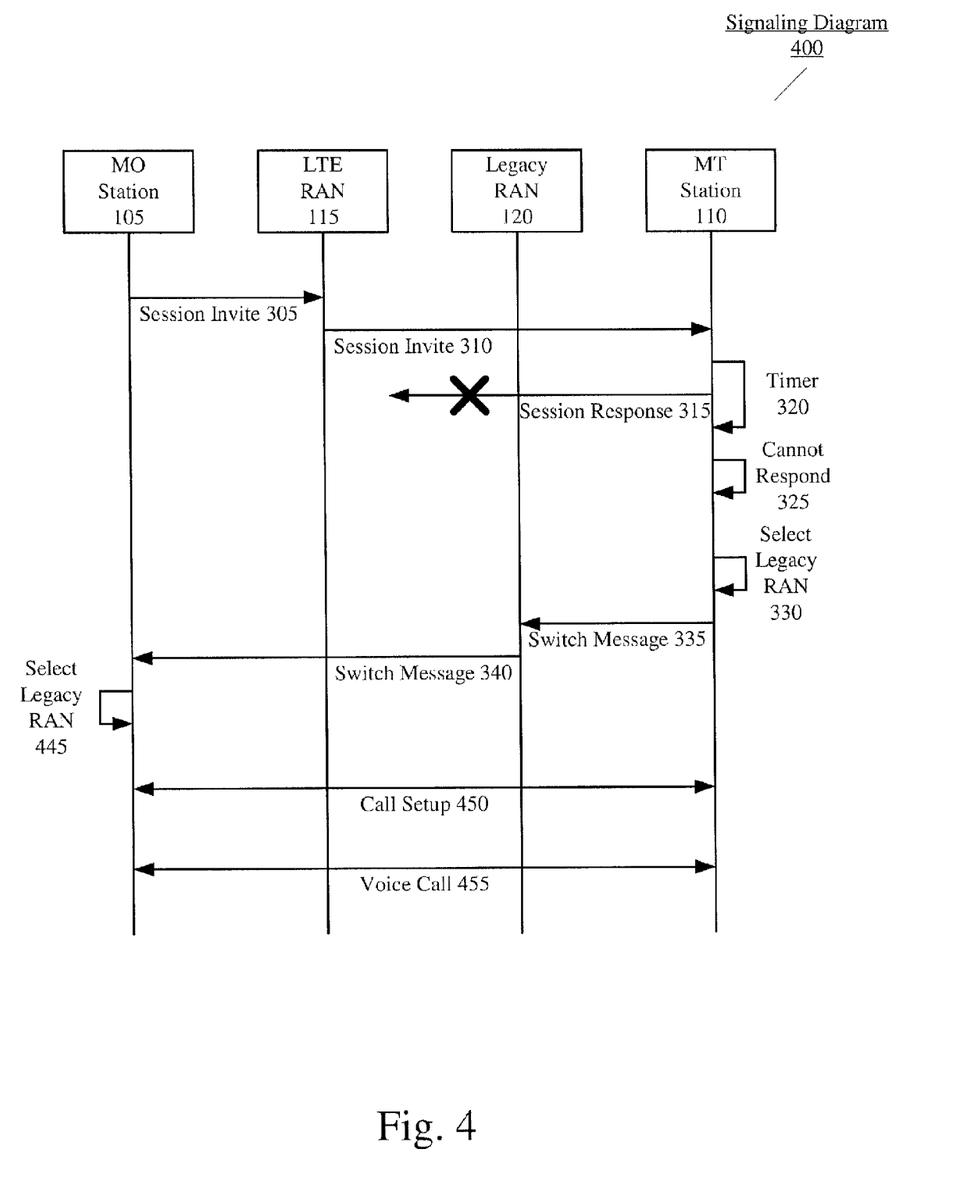
FIG. 4 shows a second exemplary signaling diagram to perform a network selection to transfer a call session from a first network to a second network.

FIG. 4 shows a second exemplary signaling diagram 400 to perform a network selection to transfer a call session from the LTE network 115 to the 3G network 120. Specifically, the signaling diagram 400 relates to an example of the MO station 105 also switching to the legacy RAN 120 after receiving the switch message. The signaling diagram 400 may include substantially similar processes as the signaling diagram 300 such as until the switch message is received by the MO station 105. Specifically, the steps of the session invites 305, 310, session response 315, timer 320, cannot respond 325, select legacy RAN 330 and switch messages 335, 340 may be performed in a substantially similar as described above with reference to the signaling diagram 300 of FIG. 3.

As illustrated in the signaling diagram 400, when the network selection application 240 of the MO station 105 receives the switch message 340, the network selection application 240 of the MO station 105 determines that the MO station 105 is also to select 445 the legacy RAN 120. In this example, the MO station 105 moves to the legacy RAN 120 autonomously upon receiving the switch message 340 from the MT station 110. Thus, the MO station 105 also associates with a base station of the legacy RAN 120 and connects to the legacy RAN 120. Upon connecting to the legacy RAN 120, the call application 235 of the MO station 105 may determine that the VoLTE call is unavailable and therefore use the circuit switched voice call. The call application 235 may re-initiate the voice call with the MT station 110 using the call setup procedure 450 of the legacy RAN 120. Since neither the MO station 105 nor the MT station 110 are using the LTE-RAN 120, the LTE-RAN 120 and the IMS 130 are not involved in this setup procedure 450. Once this setup procedure 450 has completed, the voice call 455 may be performed.

The MO station 105 also moving to the legacy RAN 120 may provide a more efficient response in handling the switch message, particularly from a network perspective. For example, there may be network delays in handling the event and re-routing a new call from the MO station 105 to the MT station 110 from the LTE-RAN 115 to the legacy RAN 120. In another example, there may be network delays in releasing the previous call context from the LTE-RAN 115 for the MT station 110.

Using the above manners of addressing the failure of establishing a voice call using VoLTE by the MT station 110, the voice call may still be maintained and performed between the MO station 105 and the MT station 110 in a seamless manner. That is, the call session may be transferred to the legacy RAN 120 in the setup procedure of the voice call for either the MT station 110 or both the MO station 105 and the MT station 110. Accordingly, when the setup procedure for the voice call would otherwise fail due to the MT station 110 being incapable of successfully transmitting the SIP response to the LTE-RAN 115, the network selection application 240 may provide a mechanism to still enable the voice call to be performed although the MT station 110 would not utilize VoLTE to participate in the voice call.

Figure 5:
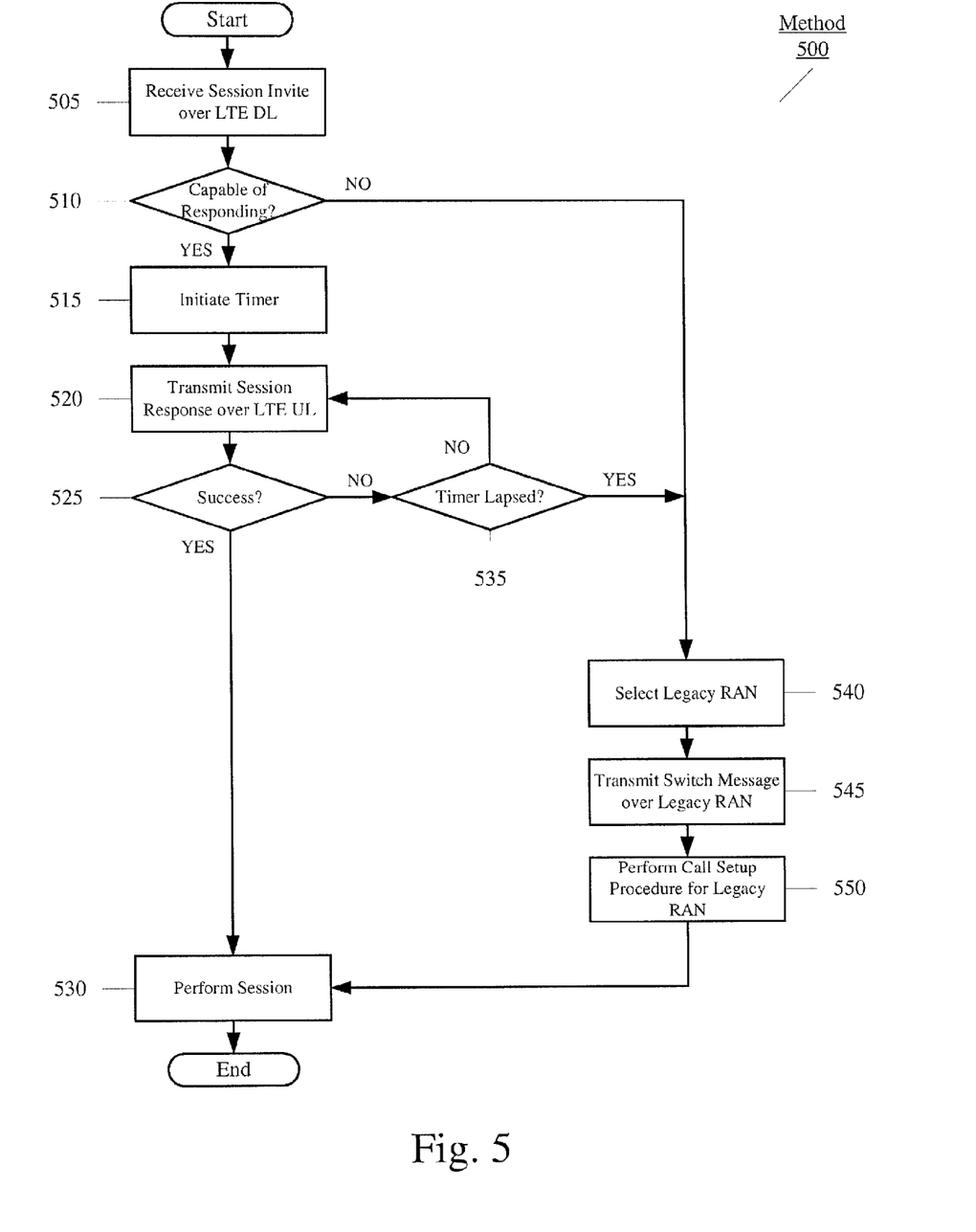
FIG. 5 shows a first exemplary method for performing a voice call by a mobile terminating station over a first or second network.

FIG. 5 shows a first exemplary method 500 for performing a voice call by the MT station 110. That is, the method 500 is from the perspective of the MT station 110 when the MT station 110 and MT station 105 implement the functionality described above for the network selection application 240 and the call application 235. It may be considered that the MT station 110 is connected to the LTE-RAN 115 prior to the method 500 starting. The method 500 will be described with regard to the network arrangement 100 of FIG. 1, the station 200 of FIG. 2 and the signaling diagrams 300, 400 of FIGS. 3 and 4, respectively.

In step 505, the call application 235 of the MT station 105 receives the session invite 310 over the downlink of the LTE-RAN 115. In step 510, the network selection application 240 of the MT station 105 determines whether the MT station 105 is capable of responding to the session invite. For example, the network selection application 240 may receive information on network parameters such as an available uplink transmission power.

If an immediate determination is made by the network selection application 240 that the MT station 110 is incapable of responding to the session invite 310, the method 500 continues to step 540, which will be described in further detail below. However, if the network selection application 240 determines that the MT station 110 is capable of using the LTE-RAN 115 or otherwise able to transmit a response, the method 500 continues to step 515.

In step 515, the network selection application 240 of the MT station 110 initiates the preset timer 320. In step 520, the call application 235 transmits a session response 315 over the uplink of the LTE-RAN 115. The call application 235 may transmit the session response until successful or until the duration of the timer lapses. In step 525, the network selection application 240 of the MT station 110 determines whether the session response 315 was successfully transmitted to the MO station 105. If successful, the method 500 continues to step 530. In step 530, the MT station 110 performs the voice call with the MO station 105. Specifically, the MT station 110 performs the voice call with the MO station using VoLTE.

Returning to step 525, if the attempt to transmit the session response is determined to be unsuccessful, the method 500 continues to step 535. In step 535, the network selection application 240 of the MT station 110 determines whether the timer 320 has lapsed. If the timer 320 is still running, the method 500 returns to step 520. However, if the timer 320 has lapsed, the network selection application 240 may determine that the LTE-RAN 115 cannot be used for a VoLTE call. Therefore, the method 500 continues to step 540.

In step 540, the network selection application 240 of the MT station 110 selects the legacy RAN 120. As discussed above, this may entail registering for SMS over the IMS 130 as well as registering for voice on 1x in 3GPP2 or on WCDMA in 3GPP. Thus, the MT station 110 is now connected to the legacy RAN 120. In step 545, the network selection application 240 of the MT station 110 transmits the switch message 335 over, for example, SMS. In step 550, the call application 235 of the MT station 110 receives the re-transmitted information to perform a call setup procedure for the voice call using the legacy RAN 120.

After performing steps 540-550, the method 500 continues to step 530 where the voice call is performed by the MT station 110 using the legacy RAN. The voice call is performed by the call application 235 of the MT station 110 as a circuit switched voice call since the legacy RAN 120 is being used.

Figure 6:
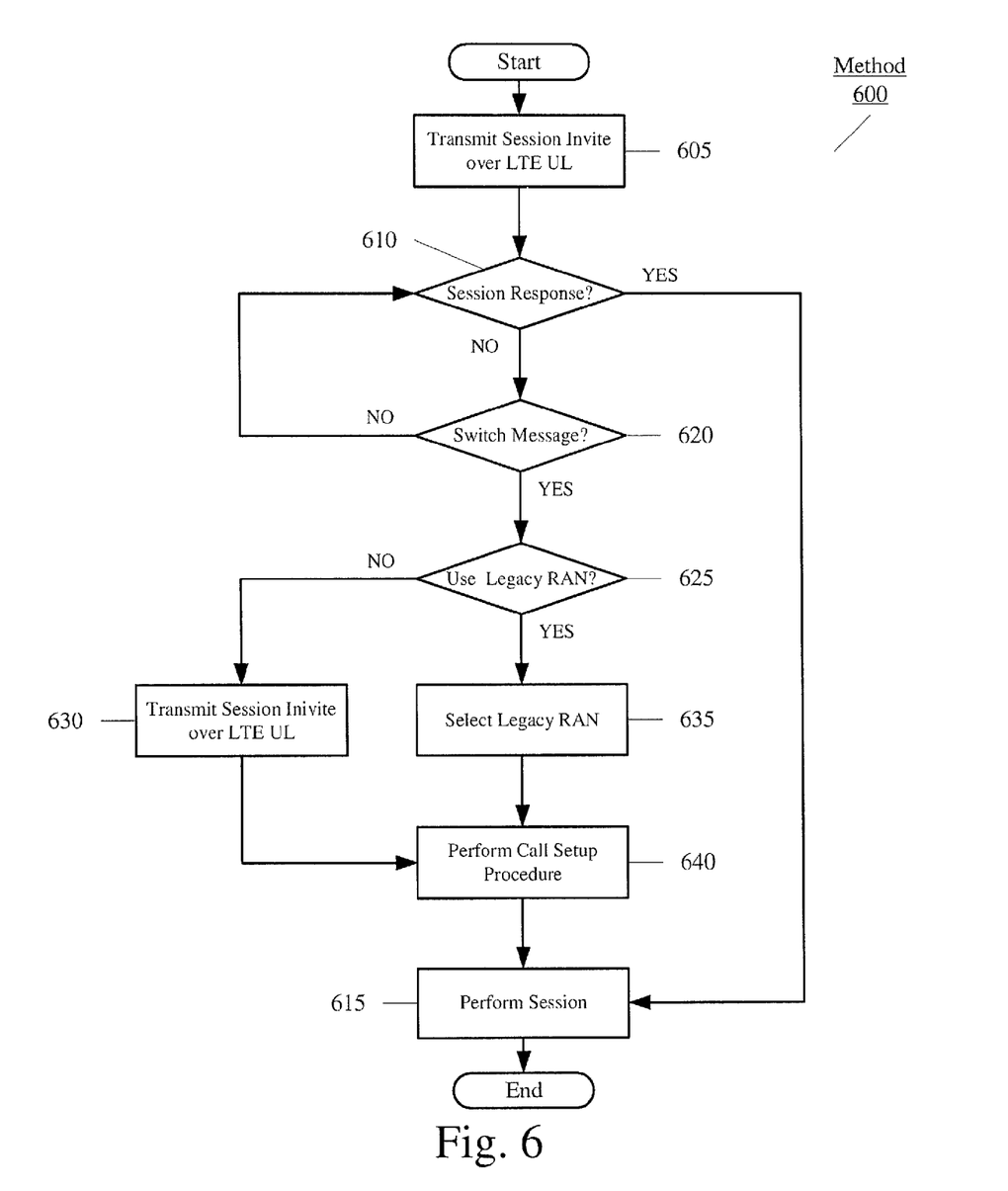
FIG. 6 shows a second exemplary method for performing a voice call by a mobile originating station over a first or second network.

FIG. 6 shows a second exemplary method 600 for performing a voice call by the MO station 110. That is, the method 600 is from the perspective of the MO station 105 when the MO station 105 and MT station 110 implement the functionality described above for the network selection application 240 and the call application 235. It may be considered that the MO station 110 is connected to the LTE-RAN 115 prior to the method 600 starting. The method 500 will be described with regard to the network arrangement 100 of FIG. 1, the station 200 of FIG. 2 and the signaling diagrams 300, 400 of FIGS. 3 and 4, respectively.

In step 605, the call application 235 of the MO station 105 transmits a session invite 305 over the uplink of the LTE-RAN 115. Using the LTE-RAN 115, the session invite 305 may be a SIP invite. In step 610, the call application 235 of the MO station 105 determines whether a session response (e.g., SIP response) has been received. As discussed above in the method 500, this may be when the MT station 110 successfully transmits the session response 315 using the uplink of the LTE-RAN 115. If the call application 235 receives the session response, the method 600 continues to step 615. In step 615, the voice call is performed. Specifically, given these circumstances, the call application 235 of the MO station 105 performs the voice call as a VoLTE call over the LTE-RAN 115.

Returning to step 610, if the session response is not received, the method 600 continues to step 620. In step 620, the network selection application 240 of the MO station 105 determines whether a switch message 340 has been received from the MT station 110, e.g., via SMS. If no switch message 340 has been received, the method 600 returns to step 610. It is noted that this process may continue until either the session response 315 or the switch message 340 is received, or a timeout period has expired when neither has been received and the call is discontinued.

If the switch message 340 is received in step 620, the method 600 continues to step 625. In step 625, the network selection application 240 of the MO station 105 determines whether the legacy RAN 120 is also to be used by the MO station 105. It should be noted that the determination of using the legacy RAN 120 may be predetermined. In a first example, the legacy RAN 120 selection may be a user input that may be toggled. In a second example, the legacy RAN 120 selection may be set by an administrator. In a third example, the network selection application 240 may dynamically determine when the legacy RAN 120 is to be used.

If the legacy RAN 120 is not to be used and the connection to the LTE network 115 is maintained, the method 600 continues to step 630. This branch of the method 600 refers to the process that is described in the signaling diagram 300, where the MO station does not switch to the legacy RAN 120. In step 630, the call application 235 of the MO station 105 transparently re-initiates the voice call by re-transmitting the session invite 345 over the uplink of the LTE-RAN 115. Subsequently, the method 600 continues to step 640, which will be described in further detail below.

Returning to step 625, if the legacy RAN 120 is to be used by the MO station 105, the method 600 continues to step 635. In step 635, the network selection application 235 of the MO station 105 selects the legacy RAN 120 and performs the corresponding operations to connect to the legacy RAN 120. This branch of the method 600 refers to the process that is described in the signaling diagram 400, where the MO station 105 switches to the legacy RAN 120 to perform the voice call.

In step 640, the call application 235 of the MO station 105 performs the call setup procedure for either the LTE-RAN 115 or the legacy RAN 120 depending upon the current connection of the MO station 105. As described above, the call setup procedure involves the MO station 105 transparently re-initiating the voice call to the MT station 110. In step 645, the call application 235 of the MO station 105 receives the session response from the MT station 110. The method 600 then continues to step 615 where the voice call is performed.

It should be noted that when step 630 is used and the connection to the LTE-RAN is maintained, the MO station 105 may participate in the voice call using a VoLTE call while the MT station 110 participates in the voice call using the circuit switched voice call. Furthermore, when steps 635 are used and the connection to the legacy RAN is used, the MO station 105 may participate in the voice call using the circuit switched voice call similar to the MT station 110.

The exemplary embodiments provide a system and method for transferring a call session by selecting a network that enables the voice call to be performed. Specifically, a MO station may invite a MT station to a voice call in which both MO and MT stations are connected to a LTE-RAN. Thus, both the MO and MT stations may participate in the voice call using a VoLTE call. For a variety of reasons, the MT station may be incapable of responding to the invitation. Since the VoLTE call is to be used and due to this incapability, the voice call would normally fail to establish. However, a network selection application of the MT station may provide a functionality to select a legacy RAN for the voice call. By providing the MO station with a switch message that impliedly indicates that the voice call has not failed and requests for a re-initiation thereof, the voice call may be established transparently.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device executing the iOS, Android or other operating system. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   transmitting, by a first station to a second station, an invite to join a voice call on a first radio access network (RAN);
   receiving, by the second station, the invite;
   generating, by the second station, a response to the invite;
   determining, by the second station, that the response cannot be successfully transmitted to the first station;
   associating, by the second station, with a second RAN;
   generating, by the second station, a message, for the first station, indicating the second station has associated with the second RAN;
   transmitting, by the second station, the message to the first station;
   determining whether the first station is to remain connected to the first RAN to perform the voice call or connect to the second RAN to perform the voice call;

connecting to the second RAN when it is determined the voice call is to be performed over the second RAN, wherein the voice call is performed as a VoLTE call by the first station when it is determined the first station is to remain connected to the first RAN;

retransmitting, by the first station, the invite to join the voice call;

receiving, by the second station, the invite on the second RAN; and setting up the voice call between the first station and the second station.

2. The method of claim 1, wherein the first station participates in the voice call using one of the first RAN or the second RAN and the second station participates in the voice call using the second RAN.

3. The method of claim 1, wherein the first RAN is one of a Long Term Evolution radio access network (LTE-RAN) or a WiFi network.

4. The method of claim 1, wherein the second RAN performs voice calls as circuit switched calls.

5. The method of claim 1, wherein information required to join the voice call comprises a call setup procedure.

6. A method comprising:
at a first station:
receiving an invite for a setup procedure of a voice call from a second station, the first station being connected to a Long Term Evolution radio access network(LTE-RAN), the first station configured to perform the voice call using Voice over LTE (VoLTE);

determining the first station is incapable of transmitting a response to the invite to the second station using the LTE-RAN, wherein the determining includes:

initiating a preset timer upon receiving the invite; and determining the first station is incapable of transmitting a response when the preset timer lapses without a successful transmission of the response;

connecting the first station to a legacy RAN, wherein the legacy RAN performs voice calls as circuit switched calls;

generating a switch message upon connecting to the legacy RAN, the switch message including an indication the first station has associated with the legacy RAN;

transmitting the switch message to the second station;

receiving the invite for a setup procedure of a voice call from the second station, wherein the setup procedure is performed consistent with the legacy RAN; and performing the voice call with the second station via the legacy RAN.

7. The method of claim 6, wherein the switch message includes an indication that the first station has switched from the LTE-RAN to the legacy RAN.

8. The method of claim 6, wherein the legacy RAN is one of a 2G RAN and a 3G RAN.

9. The method of claim 6, wherein the switch message is transmitted via a Short messaging Service (SMS) of the legacy RAN.

10. A method comprising:
at a first station:
transmitting an invite for a setup procedure of a voice call to a second station, the first station being connected to a Long Term Evolution radio access network(LTE-RAN), the first station configured to perform the voice call using Voice over LTE (VoLTE);

receiving a switch message from the second station, the switch message including an indication the second station has associated with a legacy RAN, wherein the legacy RAN performs voice calls as circuit switched calls;

determining whether the first station is to remain connected to the LTE-RAN to perform the voice call or connect to the legacy RAN to perform the voice call;

connecting to the legacy RAN when it is determined the voice call is to be performed over the legacy RAN, wherein the voice call is performed as a VoLTE call by the first station when it is determined the first station is to remain connected to the LTE-RAN;

re-transmitting the invite to the second station;

performing the setup procedure for the voice call; and performing the voice call with the second station.

11. The method of claim 10, wherein the invite is a Session Initiation Protocol (SIP) invite when the first station is connected to the LTE-RAN.

12. The method of claim 10, wherein the re-transmitting the invite is performed without user interaction.

13. The method of claim 10, wherein the legacy network is one of a 2G network and a 3G network.

14. The method of claim 10, wherein the switch message further indicates that the second station has received the invite.

15. The method of claim 10, wherein the re-transmitting of the invite is performed without paging the second station on the legacy RAN.

16. The method of claim 10, wherein the receiving the switch message from the second station indicates that the voice call has not failed to establish.

* * * * *